United States Patent [19]
Dolder

[11] 3,951,440
[45] Apr. 20, 1976

[54] PIPE BRANCH PIECE

[75] Inventor: Guido Dolder, Zurich, Switzerland

[73] Assignee: Escher Wyss Limited, Zurich, Switzerland

[22] Filed: Sept. 23, 1974

[21] Appl. No.: 508,632

[30] Foreign Application Priority Data
Sept. 27, 1973 Switzerland.................... 013826/73

[52] U.S. Cl. .............................................. 285/150
[51] Int. Cl.² ........................................ F16L 41/00
[58] Field of Search.................... 285/150, 155, 156; 138/39; 137/608

[56] References Cited
UNITED STATES PATENTS
3,376,897   4/1968   Dolder et al....................... 285/150
FOREIGN PATENTS OR APPLICATIONS
319,696   4/1957   Switzerland........................ 285/150
1,077,315   4/1954   France................................ 285/150
1,141,743   3/1957   France................................ 285/150
652,560   2/1963   Italy.................................... 285/150
350,511   1/1961   Switzerland........................ 285/150

*Primary Examiner*—Dave W. Arola
*Attorney, Agent, or Firm*—Robert A. Ostmann

[57] ABSTRACT

Pipe branch piece having a pipe leg of large diameter and pipe legs of relatively small diameter; at the junction between two inter-abutting conical pipe sections of two pipe legs of relatively small diameter, a curved reinforcing element which is situated within the pipe branch piece; said curved reinforcing element being situated outside an imaginary cylinder whose axis is situated on the axis of the conical pipe section which contacts the imaginary sphere and whose diameter is equal to the diameter of the largest circular through-flow cross-section of the pipe run connected to the same pipe leg.

5 Claims, 3 Drawing Figures

PIPE BRANCH PIECE

BACKGROUND OF THE INVENTION

The invention relates to a pipe branch piece for pressure pipe lines, more particularly for water power installations, having a large-diameter pipe leg and at least two pipe legs of relatively small diameter, the pipe sections with which the pipe legs abut on one another being conical in shape and contacting a common imaginary sphere, and at the junction region between two abutting conical pipe sections of two relatively small diameter pipe legs there is arranged a curved reinforcing element situated within the pipe branch piece. Between on the one hand the conical pipe section contacting the imaginary sphere and on the other hand the pipe line run joined to the pipe branch piece there may be arranged a second conical pipe section.

A pipe branch piece of this kind can be used as a distributing piece in which case the throughflow medium flows in through the large-diamter pipe leg and out through the pipe legs of small diameter, or as a collecting piece in which case the medium flows in the opposite direction.

In known pipe branch pieces of this kind the curved reinforcing element is so constructed that in its largest cross-section, that is to say in the cross-section which is situated in the plane defined by the pipe leg axes, only tensile stresses occur. In this way the material outlay is reduced to a minimum. (Swiss Patent No. 350,511)

SUMMARY OF THE INVENTION

The invention has as its object to provide a pipe branch piece wherein, whilst retaining the known advantageous curved reinforcing element, the resistance to throughflow within the pipe branch piece is substantially reduced.

In a pipe branch piece of the kind described initially, this object is achieved according to the invention in that the curved reinforcing element is situated outside an imaginary cylinder whose axis is situated on the axis of the conical pipe section of the pipe leg which contacts the imaginary sphere, and whose diameter is equal to the diameter of the largest circular throughflow cross-section of the pipe line run adjoining the same pipe leg.

The pipe line run can be formed of cylindrical pipe sections, but it may also have one or more conical pipe sections adjoining the pipe branch piece.

If between the conical pipe section contacting the imaginary sphere and the pipe line run adjoining the pipe branch piece there is situated a second conical pipe section, it is particularly advantageous if the curved reinforcing element is situated outside an imaginary cylinder whose axis is situated on the axis of the conical pipe section contacting the sphere, and whose diameter is equal to the diameter of the largest circular throughflow cross-section of the second conical pipe section of the pipe branch piece. It is even more advantageous if the curved reinforcing element is situated outside an imaginary cone which is formed by the prolongation of the internal wall of the second conical pipe piece.

BRIEF DESCRIPTION OF THE DRAWING

In the drawing, with which the invention is shown in detail, three constructional examples of the subject of the invention are illustrated in a simplified manner. In the drawing.

DESCRIPTION OF THE PREFERRED EMBODIMENTS

Figure 1:
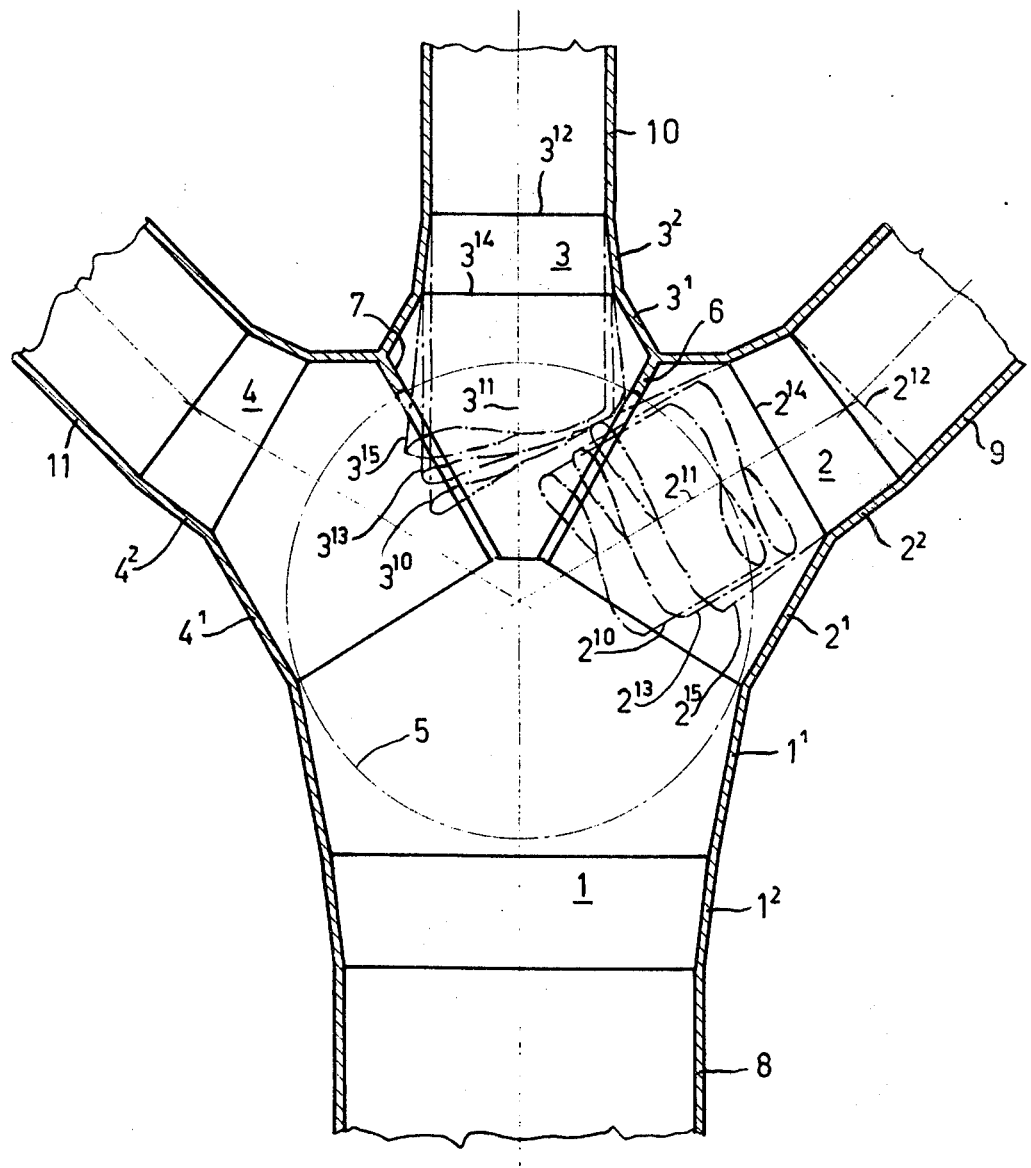
FIG. 1 shows an axial section through a pipe branch piece with adjoining pipe line runs and FIGS. 2 and 3 each show an axial section through two further pipe branch pieces.

The pipe branch piece shown in FIG. 1 which is intended for use in the pressure piping of a hydroelectric or water power plant comprises a pipe leg 1 of large diameter and three pipe legs of relatively small diameter, namely the pipe legs 2, 3 and 4. The pipe sections with which the pipe legs 1, 2, 3 and 4 abut on one another are conical in shape, contact a common imaginary sphere 5 and are designated as $1^1$, $2^1$, $3^1$ and $4^1$ respectively. At the junction region between two interabutting conical pipe sections of the relatively small diameter pipe legs, that is to say at the junction of the conical pipe sections $2^1$ and $3^1$ and at the junction of the conical pipe sections $3^1$ and $4^1$, there is arranged in each case a curved reinforcing element 6 or 7 respectively which is situated within the pipe branch piece.

The pipe line runs adjoining the pipe branch piece are designated as 8, 9, 10 and 11.

Between th conical pipe section $1^1$ contacting the imaginary sphere 5 on the one hand and the pipe line run 8 on the other hand there is situated a second conical pipe section $1^2$ of the pipe leg 1 of large diameter. Between the conical pipe section $2^1$ and the pipe line run 9 there is situated a second conical pipe section $2^2$ of the relatively small diameter pipe leg 2. In the same way a second conical pipe section $3^2$ of the pipe leg 3 of relatively small diameter is situated between the conical pipe section $3^1$ and the pipe line run 10. Also a second conical pipe section $4^2$ of the pipe leg 4 of relatively small diameter is situated between the conical pipe section $4^1$ and the pipe line run 11.

A curved reinforcing element, for example the curved reinforcing element 6, is situated outside an imaginary cylinder $2^{10}$ whose axis is situated on the axis $2^{11}$ of that conical pipe section $2^1$ of the pipe leg 2 which contacts the imaginary sphere 5, and whose diameter is equal to the diameter of the largest circular throughflow cross-section $2^{12}$ of the pipe line run 9 adjoining the same pipe leg 2. Also the curved reinforcing element 6 is situated outside an imaginary cylinder $3^{10}$ whose axis is situated on the axis $3^{11}$ of that conical pipe section $3^1$ of the pipe leg 3 which contacts the imaginary sphere 5, and whose diameter is equal to the diameter $3^{12}$ of the largest circular throughflow cross-section of the pipe line run 10 adjoining the same pipe leg 3.

The curved reinforcing element 6 is even situated outside an imaginary cylinder $2^{13}$ whose axis is situated on the axis $2^{11}$ of the conical pipe section $2^1$ of the pipe leg 2 and whose diameter is equal to the diameter of the largest circular throughflow cross-section $2^{14}$ of the pipe section $2^2$ of the branch piece. Also, the curved reinforcing element 6 is situated outside an imaginary cylinder $3^{13}$ whose axis is situated on the axis $3^{11}$ of the conical pipe section $3^1$ contacting the imaginary sphere 5, and whose diameter is equal to the diameter $3^{14}$ of the largest circular throughflow cross-section of the second conical pipe section $3^2$ of the pipe leg 3 of the pipe branch piece.

Advantageously the curved reinforcing element 6 is situated even outside an imaginary cone $2^{15}$ which is formed by the prolongation of the internal wall of the second conical pipe section $2^2$. Likewise, the reinforcing element 6 is situated outside an imaginary cone $3^{15}$ formed by the prolongation of the second conical pipe section $3^2$.

Owing to the construction of the pipe branch piece as described here, the internal curved reinforcing element 6 or 7 forms substantially no resistance to flow, so that the flow losses are considerably reduced as compared with known constructional forms.

Figure 2:
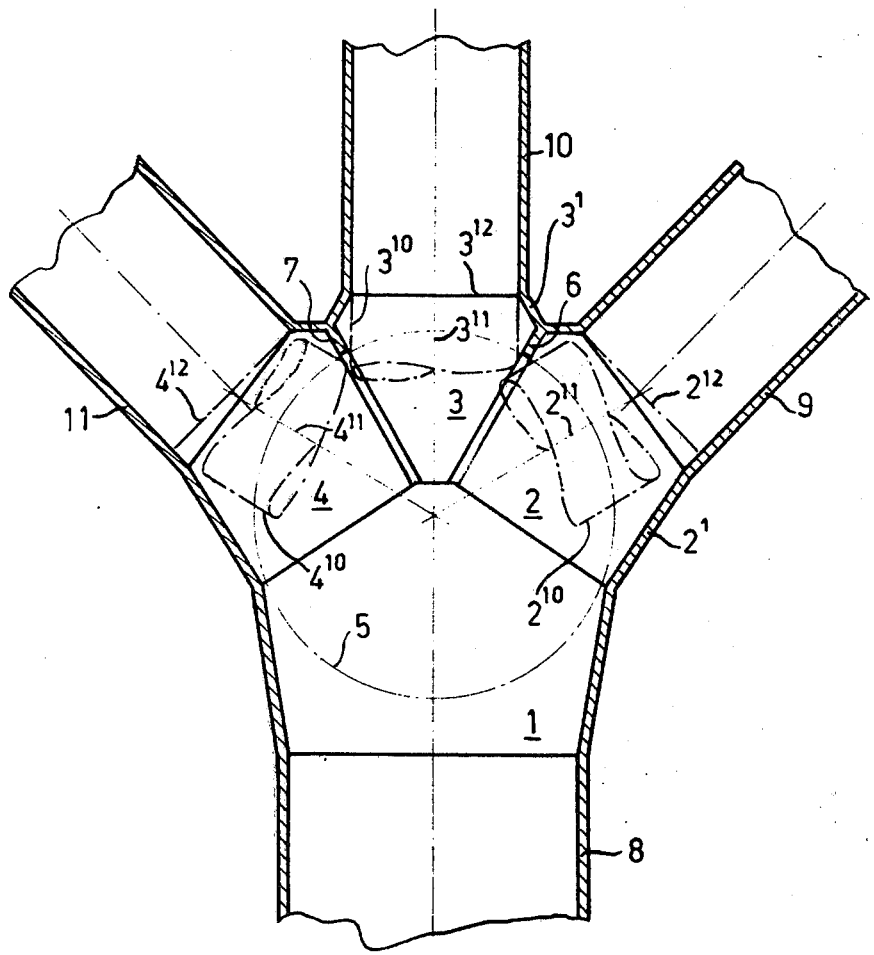

In the pipe branch piece shown in FIG. 2 the pipe branch piece comprises pipe branches or legs 1, 2, 3 and 4 which are each formed of a single conical pipe section, that is to say by the conical pipe section contacting the imaginary sphere 5.

The pipe line runs 8, 9, 10 and 11 are connected directly to the pipe branch piece formed of the four abutting conical pipe sections. The curved reinforcing element 6 is situated outside an imaginary cylinder $2^{10}$ whose axis is situated on the axis $2^{11}$ of the conical pipe section $2^1$ which contacts the imaginary sphere 5, and whose diameter is equal to the diameter $2^{12}$ of the largest circular throughflow cross-section of the pipe line run 9 adjoining the pipe leg 2. Likewise, the curved reinforcing element 6 is situated outside an imaginary cylinder $3^{10}$ whose axis is situated on the axis $3^{11}$ of the conical pipe section $3^1$ contacting the imaginary sphere 5 and whose diameter is equal to the diameter $3^{12}$ of the largest circular throughflow cross-section of the pipe line run 10 connected with the pipe leg 3.

Figure 3:
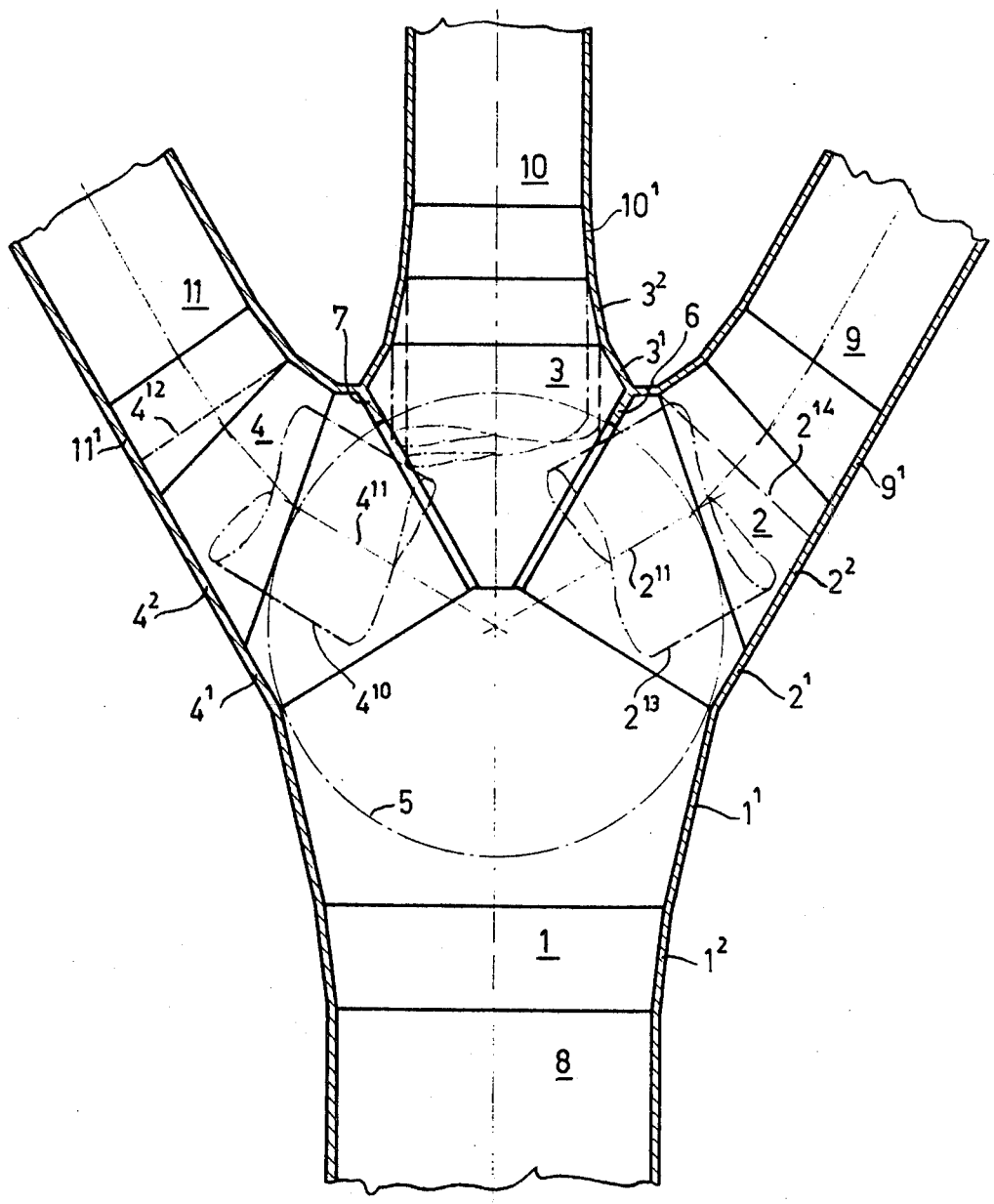

In the pipe branch piece shown in FIG. 3 the said piece comprises, in addition to the conical pipe sections $1^1$, $2^1$, $3^1$ and $4^1$ contacting the imaginary sphere 5 as in the constructional example shown in FIG. 1, second conical pipe sections $1^2$, $2^2$, $3^2$ and $4^2$ as well.

The pipe line runs 9, 10 and 11 of relatively small diameter in this case each comprise a conical pipe section $9^1$, $10^1$ and $11^1$ respectively which widens towards the pipe branch piece.

An imaginary cylinder $4^{10}$ outside which the curved reinforcing element 7 is situated has an axis which is situated on the axis $4^{11}$ of the conical pipe section $4^1$ contacting the imaginary sphere 5, and a diameter which is equal to the diameter $4^{12}$ of the largest circular throughflow cross-section of the pipe line run 11 connected to the pipe leg 4. For the reinforcing element 6 there is shown a theoretical cylinder $2^{13}$ whose axis is situated on the axis $2^{11}$ of the conical pipe section $2^1$ contacting the imaginary sphere 5, and whose diameter is equal to the diameter $2^{14}$ of the largest circular throughflow cross-section of the second conical pipe section $2^2$ of the pipe branch piece. In this constructional example the curved reinforcing elements 6 and 7 are situated outside the aforesaid imaginary cylinders. But they are not situated outside the imaginary cones which are formed by the prolongations of the second conical pipe sections $2^2$, $3^2$ and $4^2$ respectively.

The constructional features represented can also be used with symmetrical or non-symmetrical pipe branch pieces having only two pipe legs of relatively small diameter.

I claim:

1. A pipe branch piece for joining a pipe line of large diameter with at least two pipe lines of smaller diameter comprising
    a. a first pipe leg connected with the large diameter pipe line, and second and third pipe legs connected, respectively, with the pipe lines of smaller diameter,
    b. said pipe legs having adjoining pipe sections which touch a common imaginary sphere and widen conically toward that sphere; and
    c. a curved reinforcing element in the interior of the branch piece and attached to the conical sections of the second and third legs along a junction between them,
    d. the reinforcing element being situated outside each of two imaginary cylinders, one of those cylinders having an axis which coincides with the axis of the conical section of the second leg and a diameter equal to the largest circular throughflow cross section of the pipe line connected with the second leg, and the other of said cylinders having an axis which coincides with the axis of the conical section of the third leg and a diameter equal to the largest circular throughflow cross section of the pipe line connected with the third leg.

2. A pipe branch piece as defined in claim 1 in which
    a. the second pipe leg includes a second conical pipe section which connects the other conical pipe section of that leg with the associated pipe line; and
    b. said reinforcing element also is situated outside an imaginary cylinder having an axis which coincides with the axis of said other conical pipe section of the second pipe leg and a diameter equal to the diameter of the largest circular throughflow cross section of the second conical section of the second leg.

3. A pipe branch piece as defined in claim 2 in which
    a. the third pipe leg includes a second conical pipe section which connects the other conical pipe section of that leg with the associated pipe line; and
    b. said reinforcing element also is situated outside an imaginary cylinder having an axis which coincides with the axis of said other conical pipe section cf the third pipe leg and a diameter equal to the diameter of the largest circular throughflow cross section of the second conical section of the third leg.

4. A pipe branch piece as defined in claim 2 in which said reinforcing element also is situated outside an imaginary cone which is formed by prolongation of the internal wall of the second conical section of the second leg.

5. A pipe branch piece as defined in claim 3 in which said reinforcing element also is situated outside each of two imaginary cones which are formed, respectively, by prolongations of the internal walls of the second conical sections of the second and third legs.

* * * * *